United States Patent [19]

Kotlyar et al.

[11] Patent Number: 5,232,656
[45] Date of Patent: Aug. 3, 1993

[54] FAST-ACTING NUCLEAR REACTOR CONTROL DEVICE

[75] Inventors: Oleg M. Kotlyar; Phillip B. West, both of Idaho Falls, Id.

[73] Assignee: The United States of America as represented by the Department of Energy, Washington, D.C.

[21] Appl. No.: 841,109

[22] Filed: Feb. 25, 1992

[51] Int. Cl.⁵ .............................................. G21C 7/16
[52] U.S. Cl. .................................. 376/219; 376/228; 376/229; 376/230; 376/231
[58] Field of Search ................ 376/219, 230, 231, 232, 376/228, 229

[56] References Cited

U.S. PATENT DOCUMENTS

| | | | |
|---|---|---|---|
| 3,038,846 | 6/1962 | Yeomans et al. | 376/230 |
| 3,933,581 | 1/1976 | McKeehan et al. | 176/36 R |
| 3,940,310 | 2/1976 | Irion et al. | 376/219 |
| 4,092,213 | 5/1978 | Nishimura | 176/36 R |
| 4,369,161 | 1/1983 | Martin | 376/232 |
| 4,587,084 | 5/1986 | Hawke | 376/336 |
| 4,696,783 | 9/1987 | Lesauliner et al. | 376/228 |
| 4,826,649 | 5/1989 | Batheja et al. | 376/230 |
| 5,128,093 | 7/1992 | Ose | 376/219 |

*Primary Examiner*—Donald P. Walsh
*Assistant Examiner*—Frederick H. Voss
*Attorney, Agent, or Firm*—Mark P. Dvorscak; Robert J. Fisher; William R. Moser

[57] ABSTRACT

A fast-acting nuclear reactor control device for moving and positioning a safety control rod to desired positions within the core of the reactor between a run position in which the safety control rod is outside the reactor core, and a shutdown position in which the rod is fully inserted in the reactor core. The device employs a hydraulic pump/motor, an electric gear motor, and solenoid valve to drive the safety control rod into the reactor core through the entire stroke of the safety control rod. An overrunning clutch allows the safety control rod to freely travel toward a safe position in the event of a partial drive system failure.

3 Claims, 1 Drawing Sheet

FAST-ACTING NUCLEAR REACTOR CONTROL DEVICE

CONTRACTUAL ORIGIN OF THE INVENTION

The United States Government has rights in this invention pursuant to Contract No. DE-AC07-76ID01570 between the U.S. Department of Energy and EG&G Idaho, Inc.

BACKGROUND OF THE INVENTION

This invention relates generally to the operation of fast acting nuclear reactor control devices and more particularly, to a device for providing primary drive to a safety control rod in a nuclear reactor to provide for control of the nuclear reaction, and as conditions warrant, for shutdown of the nuclear reactor.

Nuclear reactors typically employ control rods which are inserted into the core of the reactor to control the level of the nuclear reaction. Control rods are commonly used during normal operation of the reactor to maintain a desired level of neutron flux in the core, and additionally, some of the safety rods provide a means for shutting down the reactor in emergency situations ("SCRAM"), or normal shutdown All such rods have a neutron absorbing portion containing a substance, such as hafnium, to control the flow of neutrons. Movement of the rods in or out of the core controls the nuclear reaction. When it is necessary to shut down the reactor during emergency situations the entire neutron absorbing portion of the safety control rod must be inserted as rapidly as possible into the reactor core.

Various fast acting nuclear reactor control devices have been employed in attempting to provide a reactor control system. Most nuclear reactor facilities use spring drives held in a strained position. For example, one design employs a compression spring and a recirculating ball lead screw arrangement. The spring provides torque to the drive system mainshaft by driving the ball lead screw. This design has several limitations. The spring provides a decreasing torque resulting in less overall energy input and requires a high retaining torque. This encumbers the fast release capabilities of an electrical clutch also employed in this design, because high currents are required in the clutch to resist this torque. Another imitation is that the highly loaded lead screw is prone to galling and lacks efficiency. Additionally, the spring and ball screw SCRAM-assist system provides torque only during about the first one-third of the safety control rod's downward stroke as it is positioned in the reactor core. The remainder of the downward stroke is effected by the weight of the rod under the influence of gravity, and water pressure if so configured.

Accordingly, it is an object of the present invention to overcome the inefficiencies of present nuclear reactor safety control rod drive units to improve the safety and reliability of nuclear reactor operation.

It is a further object of the present invention to provide a fast acting nuclear reactor control device which improves the safety performance and reliability of nuclear reactor operation.

Another object of the present invention is to provide a nuclear reactor control device which better maintains power and force to compel safety-rod insertion over the full length of the control rod.

Yet another object of the present invention is to provide a nuclear reactor control device which provides for easy adjustment and control of the control rod.

An additional object of the present invention is to provide a nuclear reactor control device which allows the safety control rod system to freely travel toward a safe position in the event of a partial drive system failure.

SUMMARY OF THE INVENTION

This invention provides a fast-acting nuclear reactor control device for controlling and positioning a safety control rod within the core of a nuclear reactor, the nuclear reactor being controlled by a reactor control system. The device includes a primary safety control rod drive means operatively connected to the safety control rod for driving and positioning the safety control rod within or without the reactor core. The safety control rod is oriented in a substantially vertical position to allow the safety control rod to fall into the reactor core under the influence of gravity and water pressure during shutdown of the reactor. The safety control rod is connected to a rack, and the primary drive means can be a safety control rod drive shaft having a pinion driving the rack for allowing the safety control rod to be positioned within or without the reactor core. The primary drive means is further operatively connected to a hydraulic pump such that operation of the primary drive means simultaneously drives the safety control rod to desired positions within the reactor core and operates the hydraulic pump such that a hydraulic fluid is forced into a pressurized accumulator, charging the accumulator with compressed gas for the storage of potential energy. A solenoid valve is interposed between the hydraulic pump and the accumulator, the solenoid valve being a normally open valve actuated to a closed position when the safety control rod is out of the reactor core during reactor operation. The solenoid valve opens in response to a signal from the reactor control system calling for shutdown of the reactor with rapid insertion of the safety control rod into the reactor core, such that the opening of the solenoid valve releases the potential energy in the accumulator to cause hydraulic fluid to flow back through the hydraulic pump, converting the hydraulic pump to a hydraulic motor having speed and power capable of full length insertion and high speed driving of the safety control rod into the reactor core. The insertion of the safety control rod will now be powered by the combined effects of high pressure gas, gravity, an differential water pressure. This will ensure rapid and reliable operation.

The primary drive means or safety control rod drive shaft can include an electromagnetic clutch co-axial with the drive shaft for positioning the safety control rod in a run position. Further, the primary drive means includes an overrunning clutch co-axial with the drive shaft and located intermediate the hydraulic motor and the electromagnetic clutch. This overrunning clutch is capable of allowing the speed of the primary drive means to rotate at a speed greater than the speed of the hydraulic motor during shutdown of the reactor to provide for rapid insertion of the safety control rod into the reactor core.

A reservoir of hydraulic fluid is connected to the hydraulic pump. The primary drive means further includes a drive motor driving through the electromagnetic clutch to position the safety control rod in a run position while simultaneously driving the hydraulic pump through the overrunning clutch. In this manner, hydraulic fluid is transferred from the reservoir to the accumulator.

BRIEF DESCRIPTION OF THE DRAWING

The above-mentioned and other features of the invention will become more apparent and be best understood, together with the description, be reference to the accompanying drawing, in which.

DETAILED DESCRIPTION OF THE INVENTION

Figure 1:
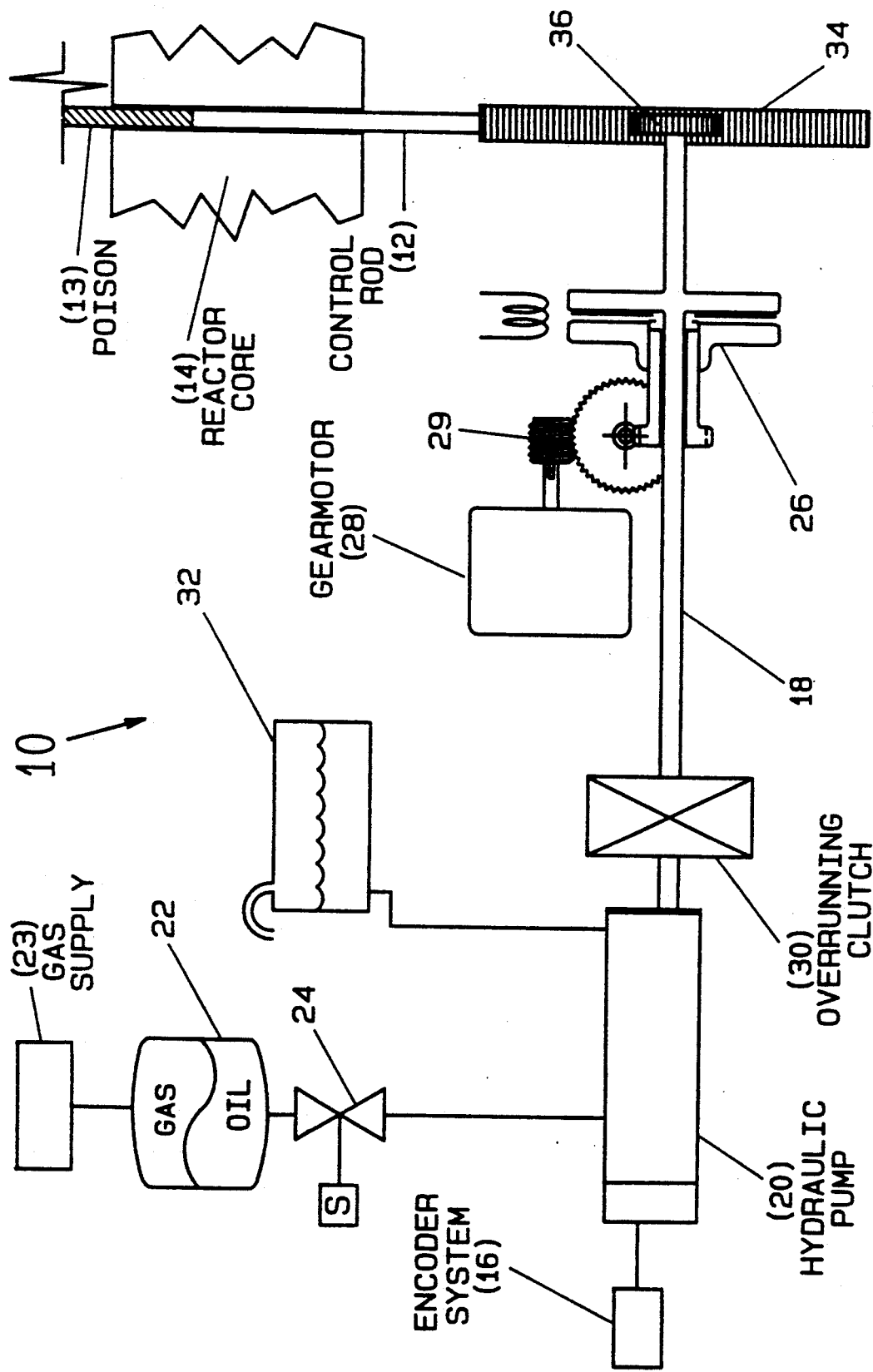
FIG. 1 shows a schematic representation of a fast acting nuclear reactor control device in accordance with the present invention.

FIG. 1 illustrates a layout scheme of a fast acting nuclear reactor control device 10. The device 10 controls a safety control rod 12 within or without the core 14 of a nuclear reactor. The safety control rod's position is indicated by an encoder system 16. A primary safety control rod drive means, or drive shaft, 18 is operatively connected to the safety control rod 12, for driving and positioning the safety control rod within or without the reactor core 14. More specifically, the control rod 12 is a typical nuclear reactor control rod as described previously that includes a neutron absorber (poison), shown as the shaded portion 13. The position of the control rod 12 shown in FIG. 1 is half withdrawn (or half inserted). Rotation of the shaft 18 to raise the control rod 12 will position the poison portion 13 in the full "out" position for full reactor power. Lowering the assembly will place the poison 13 within the core 14. As shown, the safety control rod 12 is oriented in a substantially vertical position in a reactor of downward coolant flow to allow the safety control rod to fall into the reactor core under the influence of gravity and water pressure during shutdown of the reactor.

The drive shaft 18 is also operatively connected to a hydraulic pump 20. The operation of the drive shaft 18 drives and positions the safety control rod 12 within or without the reactor core 14, while simultaneously operating the hydraulic pump 20 such that hydraulic fluid is forced into a pressurized accumulator 22. This fills or charges the accumulator 22 with oil while under pressure of compressed gas which provides storage of potential energy, the us of which will be explained below. A high pressure gas supply 23 supplies gas for pressurizing the accumulator.

An electromagnetic clutch 26 is coaxial with the drive shaft 18. The drive shaft 18 is powered by an electric gearmotor 28. The gearmotor has a double worm gear reducer 29 and is self locking. The gear motor 28 driving through the electrically engaged clutch 26 will thus position the safety control rod 12 in the run position.

To eliminate constant pressure on the hydraulic pump 20, which would tend to cause the shaft to rotate in the rod-insertion direction, a solenoid operated valve 24 can be interposed between the hydraulic pump 20 and the accumulator 22. This solenoid operated valve is a normally open valve, remaining open except when electrical power is applied to its solenoid. Power is applied to close the valve 24 only when the safety control rod 12 is out of the reactor core 14 for reactor operation. Should electrical power fail or a signal be received from the encoder system 16 calling for rapid insertion of the safety control rod, the solenoid valve 24 will open to release the potential energy in the accumulator to provide primary motive force to drive the safety control rod. The electromagnetic clutch 26 will also release allowing the shaft 18 to rotate.

More specifically, the opening of the solenoid valve releases the hydraulic oil, pressurized by compressed gas in the accumulator 22 and forces the hydraulic fluid to flow back through the hydraulic pump, thereby converting the hydraulic pump 20 to a hydraulic motor, rotating the shaft 18, and inserting the safety control rod 12. This hydraulic drive accelerates the safety control rod 12 and maintains a drive force torque via the high pressure gas of the accumulator 22. The insertion of the safety control rod 12 is now powered by the combined effects of high pressure gas, gravity, and differential hydraulic pressure. The compressed gas provides the energy necessary for full length and high speed insertion of the safety control rod 12.

The maximum driving force can be easily adjusted by adjusting the gas pressure in the accumulator (up to the maximum pressure that the safety control rod drive motor is able to provide) and can be increased above this level while the reactor is operating in preparation for fast SCRAM. Once the safety control rod is withdrawn the solenoid valve 24 can close and the current to the clutch 26 can automatically drop to a lower level, and thus reduce the clutch release time. With the solenoid valve closed only the safety control rod's torque can pass through the clutch.

The safety control rod 12 is also connected to a rack gear 34, and the safety control rod drive shaft 18 has a pinion gear 36 in contact with the rack for allowing the safety control rod to be positioned within or without the reactor core. The novel features of the invention described herein are functional regardless of whether the rack 34 is above the poison 13 and core 14, or below the poison and core. However, for the gravity assisted SCRAM feature, the poison 13 must be above the core 14 as is shown in FIG. 1. Other mechanisms for positioning the safety control rod within or without the reactor core are also possible.

In addition, an overrunning clutch 30 can be coaxial with the drive shaft 18, located intermediate the hydraulic motor 20 and the electromagnetic clutch 26. The overrunning clutch 30 is capable of allowing the speed of the drive shaft 18 to rotate at a speed greater than the speed of the hydraulic motor during shutdown of the reactor to provide for rapid insertion of the safety control rod into the reactor core in the event of partial drive system failure. The overrunning clutch 30 will allow the safety control rod 12 to move back down into the reactor core, due to gravity and pressure drop across the safety control rod, caused by coolant flow through the reactor even if the SCRAM system (whether it is the currently utilized cocked-spring system or the disclosed hydraulic system) has failed and locked the SCRAM system. The overrunning clutch also will not allow the SCRAM system to hinder safety control rod insertion speed if the SCRAM shaft is turning slower than the main safety rod shaft.

Additionally, a reservoir of hydraulic fluid 32 is connected to the hydraulic pump 20 for pump supply. The electric motor 28, driving through the electrically engaged clutch 26 will position the safety control rod 12 in the run position, while also driving, via the overrunning clutch 30, the hydraulic pump 20, which thus transfers hydraulic fluid from the reservoir 32 to the accumulator 22. The clutch 26 will operate at high current during cocking until the solenoid valve 24 closes. With the hydraulic power now contained, the current may drop to low levels, reducing a release lug in the clutch during a SCRAM.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described to best explain the principles of the invention and its practical application and thereby enable others skilled in the art to best utilize the invention in various embodiments and with various modifications as ar suited to the particular use contemplated. It is intended that the scope of the invention be defined by the claims appended hereto.

The embodiments of the invention in which exclusive property rights or privileges are claimed is defined as follows:

1. A fast-acting nuclear reactor control device for controlling a safety control rod within the core of a nuclear reactor, the reactor controlled by a reactor control system, the device comprising:

a safety control rod drive shaft and an electromagnetic clutch co-axial with the drive shaft operatively connected to the safety control rod for driving and positioning the safety control rod within or without the reactor core during reactor operation, the safety rod being oriented in a substantially vertical position to allow the rod to fall into the reactor core under the influence of gravity during shutdown of the reactor;

the safety control rod drive shaft further operatively connected to a hydraulic pump such that operation of the drive shaft simultaneously drives and positions the safety control rod and operates the hydraulic pump such that a hydraulic fluid is forced into an accumulator, filling the accumulator with oil for the storage and supply of primary potential energy for safety control rod insertion such that the release of potential energy in the accumulator causes hydraulic fluid to flow through the hydraulic pump, converting the hydraulic pump to a hydraulic motor having speed and power capable of full length insertion and high speed driving of the safety control rod into the reactor core;

a solenoid valve interposed between the hydraulic pump and the accumulator, said solenoid valve being a normally open valve, actuated to close when the safety control rod is out of the reactor during reactor operation; and further wherein said solenoid opens in response to a signal from the reactor control system calling for shutdown of the reactor and rapid insertion of the safety control rod into the reactor core, such that the opening of the solenoid releases the potential energy in the accumulator to place the safety control rod in a safe shutdown position;

and further wherein the safety control rod drive shaft includes an overrunning clutch co-axial with the drive shaft and located intermediate the hydraulic motor and the electromagnetic clutch; the overrunning clutch capable of allowing the speed of the safety control rod drive shaft to rotate at a speed greater than the speed of the hydraulic motor during shutdown of the reactor to provide for rapid insertion of the safety control rod into the reactor core.

2. The reactor control device of claim 1 further including a reservoir of hydraulic fluid connected to the hydraulic pump, and wherein the safety control rod drive shaft further includes a drive motor driving through the electromagnetic clutch to position the safety control rod in a run position while simultaneously driving the hydraulic pump through the overrunning clutch, whereby hydraulic fluid is transferred from the reservoir to the accumulator.

3. The reactor control device of claim 2 wherein the safety control rod is connected to a rack, and the safety control rod drive shaft has a pinion operatively connected to the rack for positioning of the safety control rod within or without the reactor core.

* * * * *